United States Patent
Im et al.

(10) Patent No.: US 8,019,025 B2
(45) Date of Patent: Sep. 13, 2011

(54) TRAINING SEQUENCE FOR WIRELESS COMMUNICATION SYSTEM

(75) Inventors: Sebin Im, Gyeonggi-do (KR); Hyungjin Choi, Seoul (KR)

(73) Assignee: Sungkyunkwan University Foundation for Corporate Collaboration, Suwon, Gyeonggi-do (KR)

( * ) Notice: Subject to any disclaimer, the term of this patent is extended or adjusted under 35 U.S.C. 154(b) by 848 days.

(21) Appl. No.: 11/707,605

(22) Filed: Feb. 15, 2007

(65) Prior Publication Data

US 2008/0170560 A1  Jul. 17, 2008

(30) Foreign Application Priority Data

Jan. 11, 2007  (KR) .................. 10-2007-0003158

(51) Int. Cl.
*H03D 1/00*  (2006.01)
*H04L 7/06*  (2006.01)
*H04L 7/00*  (2006.01)
*H04B 3/10*  (2006.01)
*H04J 3/06*  (2006.01)

(52) U.S. Cl. ........ 375/343; 375/364; 375/365; 375/368; 370/491; 370/503

(58) Field of Classification Search .................. 375/332, 375/334, 340, 343, 344; 370/203, 207, 208, 370/210
See application file for complete search history.

(56) References Cited

U.S. PATENT DOCUMENTS

| 7,061,997 B1 * | 6/2006 | Eberlein et al. ............... 375/332 |
| 2007/0147552 A1 * | 6/2007 | Olesen et al. ............... 375/343 |

FOREIGN PATENT DOCUMENTS

KR  1020060036410 A  4/2006

OTHER PUBLICATIONS

Wen et al., "CAZAC sequence and its application in LTE random access," Proceedings of 2006 IEEE Information Theory Workshop, pp. 544-547.*
Korean Office Action for Korean Patent Application No. 10-2007-0003158, counterpart to U.S. Appl. No. 11/707,605, dated Apr. 29, 2008.

(Continued)

*Primary Examiner* — Chieh M Fan
*Assistant Examiner* — Eboni Hughes
(74) *Attorney, Agent, or Firm* — Edwards Angell Palmer & Dodge LLP; Kongsik Kim

(57) ABSTRACT

Disclosed is a system and a training sequence setting method for performing frame synchronization in a wireless communication system. A received signal is affected by a frequency offset due to an oscillator mismatch between the transmitter and the receiver, which is one of the main causes of performance degradation of frame synchronization. In a prior Constant Amplitude Zero Auto-Correlation (CAZAC) sequence, the larger the frequency offset becomes, the more conspicuously the performance degradation of the frame synchronization occurs. The proposed training is designed to maintain a prior CAZAC property during a differential detection so as to perform a differential detection-based frame synchronization sequence insensitive to the frequency offset. As a result of performance verification, the proposed training sequence indicates that its performance of the frame synchronization is irrespective of the frequency offset, and has a better performance than the prior CAZAC sequence and random sequence.

3 Claims, 8 Drawing Sheets

OTHER PUBLICATIONS

R. L. Frank, et al.; "*Phase Shift Pulse Codes With Good Periodic Correlation Properties*"; IRE Transactions on Information Theroy; Oct. 1962; pp. 381-382.

David C. Chu; "*Polyphase Codes With Good Periodic Correlation Properties*"; IEEE Transactions on Information Theory; Jul. 1972; pp. 531-532.

Won-Gi Jeon, et al.; "*Timing Synchrfonization for IEEE 802.15.3 WPAN Applications*"; IEEE Communications Letters, vol. 9; No. 3; Mar. 2005; pp. 255-257.

3rd Generation Partnership Project; Technical Specification Group Radio Access Network; Physical layer aspects for evolved Universal Terrestrial Radio Access (UTRA) (Release 7); 3GPP TR 25.814.; V7.0.0; (Jun. 2006); pp. 1-126.

* cited by examiner

TRAINING SEQUENCE FOR WIRELESS COMMUNICATION SYSTEM

CROSS-REFERENCE TO RELATED APPLICATION

The present application claims, under 35 U.S.C. §119(a), the benefit of Korean Patent Application No. 10-2007-0003158, filed Jan. 11, 2007, the entire contents of which are hereby incorporated by reference.

BACKGROUND OF THE INVENTION

1. Field of the Invention

The present invention relates to a wireless communication system for improving the performance of frame synchronization by using a training sequence. More particularly, the present invention relates to a wireless communication system for improving the performance of frame synchronization in an actual receiving environment by making up for characteristics that cause performance degradation of a Constant Amplitude Zero Auto-Correlation (CAZAC) sequence due to a frequency offset. The present invention also relates to a method for forming a new training sequence for improving the performance of the frame synchronization in a wireless communication system.

2. Background Art

A wireless communication system usually includes a Base Station (BS) and a Mobile Station (MS) in order to support wireless communication services. The BS and MS support the services by using frames. They are required to acquire a mutual synchronization so as to transmit/receive frames. In order to acquire the mutual synchronization, the BS transfers a synchronizing signal so that the MS may detect the start of a frame that the BS transmits. In the wireless communication system, for acquiring the mutual synchronization in this manner, so as to precisely detect a starting point in time of the frame of a received signal, a training sequence is transmitted as the training sequence is arranged in the fore part of the frame. The training sequence corresponds to a signal of which a promise is made between a transmitter and a receiver. The receiver performs frame synchronization that detects the starting point in time of the frame by using a correlation pattern between the received signal and an original signal. A signal transmitted in a wireless communication environment can be distorted in various forms (e.g., a reflected wave, a diffracted wave, noise, multi-path interference, etc.) in the course of a transmission process. In addition, the signal transmitted can cause a problem such as a frequency offset due to an oscillator mismatch between the transmitter and the receiver. Therefore, it is necessarily demanded to design an adequate training sequence and a frame synchronization algorithm that can overcome the above problems.

CAZAC sequence among known training sequences has good properties of Peak-to-Average Power Radio (PAPR) and auto-correlation (refer to [1] R. L. Frank and S. A. Zadoff, "Phase Shift Pulse Codes with Good Periodic Correlation Properties," IRE Trans. on IT, Vol. IT-7, pp 381-382, October 1962, [2] D. C. Chu, "Polyphase Codes with Good Periodic Correlation Properties," IEEE Trans. on IT, Vol. IT-18, pp 531-532, July 1972, and [3] K. Fazel and S. Keiser, "Multi Carrier and Spread Spectrum Systems," John Willey and Sons, 2003). Hence, CAZAC sequence is applied to a training sequence for frame synchronization in various systems, such as Orthogonal Frequency Division Multiplexing (OFDM), Single Carrier-Frequency Domain Equalization (SC-FDE), Ultra Wide Band (UWB), etc., ([4] refer to 3GPP TR 28.814, "Physical Layer Aspects for Evolved Universal Terrestrial Radio Access (UTRA)").

Still, CAZAC sequence has the largest weak point in that CAZAC sequence cannot show a stable performance with respect to a frequency offset which can be incurred in the first stage of reception of a signal on characteristics of the signal itself. Namely, the larger the frequency offset becomes, the more conspicuously the performance degradation occurs. In a case where the frequency synchronization is not performed, it takes much time to detect the starting point in time of the frame. Especially, a stable frame synchronization cannot be performed in an environment where a large frequency offset can be generated, i.e., in a wireless communication system which has a low complexity and a low unit price, and in which the accuracy of an oscillator at the receiving end is not high.

SUMMARY OF THE INVENTION

Accordingly, the present invention has been made to solve the above-described problems occurring in a wireless communication system for performing frame synchronization by using a training sequence. One object of the present invention is thus to provide a wireless communication system for improving the performance of frame synchronization in an actual receiving environment of the wireless communication system in which a frequency offset is generated, and a method for forming a new training sequence by which the performance of frame synchronization is improved in the wireless communication system.

Another object of the present invention is to provide a wireless communication system and a method for forming a new training sequence, by which a stable frame synchronization can be performed in an environment where a large frequency offset can be generated, i.e., even in a wireless communication system which has a low complexity and a low unit price, and in which the accuracy of an oscillator at the receiving end is not high.

In order to accomplish the above objects of the present invention, in one aspect, the present invention provides a method for setting a training sequence in a wireless communication system, the method comprising the step of setting a training sequence so that a first correlation property obtained by performing a correlation process of a training sequence by using a scheme of a differential detection has a similar result to a second correlation property obtained by performing a correlation process of a training sequence by using a scheme of a simple correlation.

Preferably, the training sequence corresponds to a Constant Amplitude Zero Auto-Correlation (CAZAC) sequence.

In another aspect, the present invention provides a method for setting a training sequence and performing frame synchronization in a wireless communication system which includes a transmission unit comprising a Digital-to-Analog (D/A) converting unit for inputting a training sequence and a data & control signal, and a Radio Frequency (RF) processing unit; and a receiving unit comprising an RF processing unit, the A/D converting unit, and a differential detection-based frame synchronizing unit, the method comprising the step of setting the training sequence so that a first correlation property obtained by performing a correlation process using a scheme of a differential detection has a similar result to a second correlation property obtained by performing a correlation process using a scheme of a simple correlation with respect to a received signal from an Analog-to-Digital (A/D) converting unit in the differential detection-based frame synchronizing unit.

Preferably, the differential detection-based frame synchronizing unit may comprise a delay & complex conjugate unit, a correlating unit, a maximum correlation value detecting unit, and a timing control unit.

Also preferably, the training sequence corresponds to a Constant Amplitude Zero Auto-Correlation (CAZAC) sequence.

In a further aspect, the present invention provides a system for performing frame synchronization by using a training sequence in a wireless communication system, the system comprising: a transmission unit comprising a Digital-to-Analog (D/A) converting unit for inputting a training sequence and a data & control signal, and a Radio Frequency (RF) processing unit; and a receiving unit comprising an RF processing unit, an A/D converting unit, and a differential detection-based frame synchronizing unit, wherein the differential detection-based frame synchronizing unit comprises a delay & complex conjugate unit, a correlating unit, a maximum correlation value detecting unit, and a timing control unit.

Preferably, the training sequence corresponds to a Constant Amplitude Zero Auto-Correlation (CAZAC) sequence.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
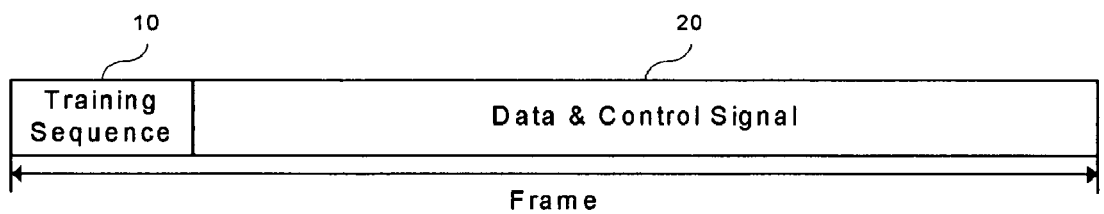
FIG. 1 is a view illustrating a structure of a frame including a training sequence according to a preferred embodiment of the present invention.

Hereinafter, preferred embodiments of the present invention will be described with reference to the accompanying drawings. The same elements will be designated by the same reference numerals all through the following description and drawings although they are shown in different drawings. Further, in the following description of the present invention, a detailed description of known functions and configurations incorporated herein will be omitted when it may make the subject matter of the present invention rather unclear.

FIG. 1 is a view illustrating a structure of a frame including a training sequence according to a preferred embodiment of the present invention.

With reference to FIG. 1, a training sequence 10 is transmitted as the training sequence 10 is arranged at the foremost part of a frame, and a data & control signal 20 is set in order to be transmitted following the training sequence.

Figure 2:
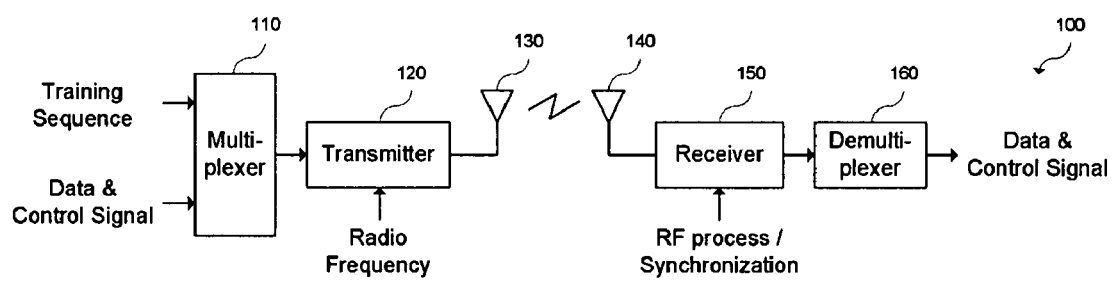
FIG. 2 is an example view illustrating a configuration of a transceiver of the general wireless communication system.

FIG. 2 is an example view illustrating a configuration of a transceiver of the general wireless communication system.

As shown in FIG. 2, a wireless communication system includes a multiplexer 110, a transmitter 120, a transmission (tx) antenna 130, a receive (rx) antenna 140, a receiver 150, and a demultiplexer 160.

The multiplexer 110 arranges the training sequence 10 and the data & control signal 20 in a prescribed order and in prescribed positions, and integrates arranged signals. The transmitter 120 converts the frequency of a signal to be transmitted into a Radio Frequency (RF) thereof, and amplifies electric power of the signal having the RF frequency to be transmitted. Then, the transmitter 120 transmits the amplified signal having the RF frequency on a wireless channel via the tx antenna 130. The receiver 150 converts the RF frequency of a signal received from the rx antenna 140 into an Intermediate Frequency (IF) or a baseband frequency as reducing noise of the received signal, and performs Analog-to-Digital (A/D) conversion in order to perform a digital signal processing. The demultiplexer 160 distinguishes between the data and the control signal of a signal which has been transmitted, and separates the data from the control signal. Because the configuration of the transceiver of the above wireless communication system is an already known configuration, a detailed description will be omitted in the present invention.

Figure 3:
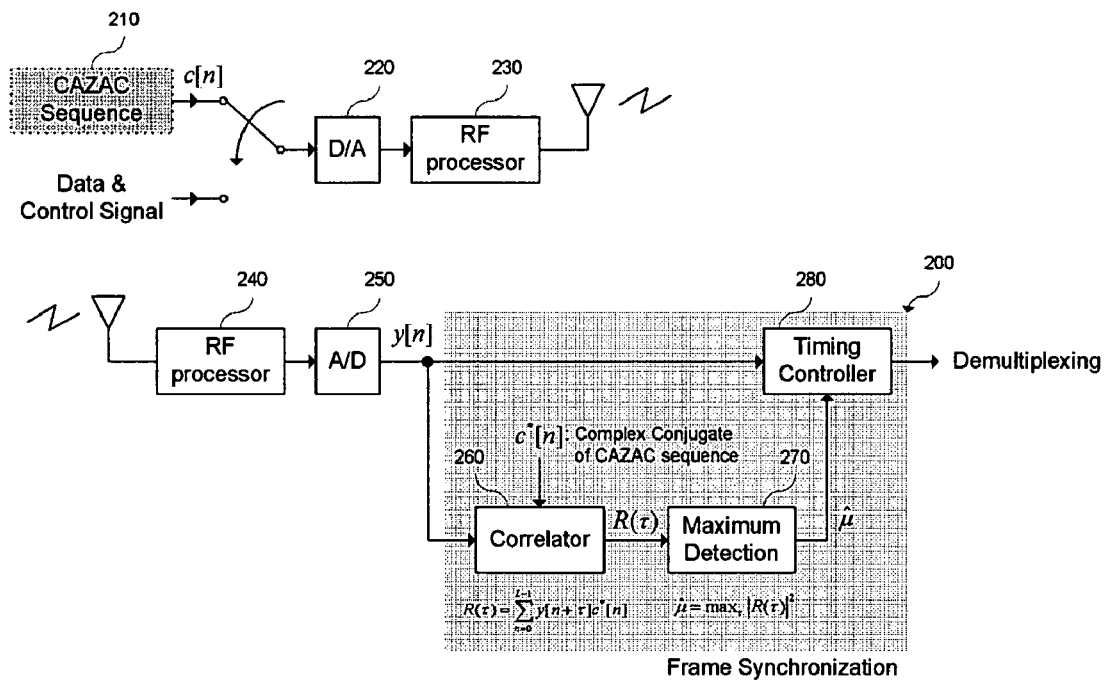
FIG. 3 is a block diagram illustrating the configuration of frame synchronization of a prior transmitting unit and receiving unit using a prior training sequence.

FIG. 3 is a block diagram illustrating the configuration of frame synchronization of a prior transmitting unit and receiving unit using a prior training sequence.

With reference to FIG. 3, a CAZAC sequence 210 corresponding to a prior training sequence is input with a switching operation ahead of the data & control signal 20, and is transmitted on a wireless channel via a Digital-to-Analog (D/A) converter 220 and an RF processor 230. A receiving unit includes an RF processor 240, an A/D converter 250, and a frame synchronization 200 which is based on a prior simple correlation. Herein, the frame synchronization 200 includes a correlator 260, a maximum detection 270, and a timing controller 280.

When a received signal which considers a timing offset $\tau$ past the A/D converter 250 is set to $y[n+\tau]$, a process of the correlator 260 using the prior CAZAC sequence by using a scheme of the prior simple correlation can be represented as in EXPRESSION 1.

Expression 1

$$R(\tau) = \sum_{n=0}^{L-1} y[n+\tau]\overset{*}{c}[n],$$

where L represents a length of the training sequence, and c[n] represents a usual CAZAC sequence.

c[n] is set differently depending on a sectionalizing factor k as in EXPRESSION 2.

Expression 2

$$c[n] = \begin{cases} \exp\left[\dfrac{j2\pi k}{L}\left(n + n\dfrac{n+1}{2}\right)\right], & L \text{ is odd} \\ \exp\left[\dfrac{j2\pi k}{L}\left(n + \dfrac{n^2}{2}\right)\right], & L \text{ is even} \end{cases}$$

A process of the maximum detection 270 following the process of the correlator 260 can be represented as in EXPRESSION 3, and an estimated timing offset, i.e., a frame starting point $\hat{\mu}$, is delivered to the timing controller 280.

Expression 3

$$\hat{\mu} = \max_{\tau} |R(\tau)|^2$$

In this manner, in the wireless communication system which performs the process of the correlator 260 by using the conventional CAZAC sequences, the CAZAC sequence has good properties of Peak-to-Average Power Ratio (PAPR) and auto-correlation, which can improve the performance of the wireless communication system as a whole. However, as described above, the above CAZAC sequence has the most predominant drawback in that the above CAZAC sequence cannot show stable performance with respect to a frequency offset, which can be incurred in the first stage of reception of a signal on characteristics of the signal itself. Accordingly, the larger the frequency offset becomes, the more conspicuously the performance degradation occurs. Moreover, in a case where frequency synchronization is not performed, it takes too much time to detect the starting point in time of the frame. In particular, a stable frame synchronization cannot be performed in an environment where a large frequency offset can be generated, i.e., in a wireless communication system which has a low complexity and a low unit price, and in which the accuracy of an oscillator at the receiving end is not high.

In a wireless communication system of the present invention, a prior CAZAC sequence is modified in the following scheme so that a frame synchronization algorithm which is based on differential detection, may be applied to a receiver in order to make up for characteristics causing the performance degradation of the above prior CAZAC sequence due to the frequency offset.

Figure 4:
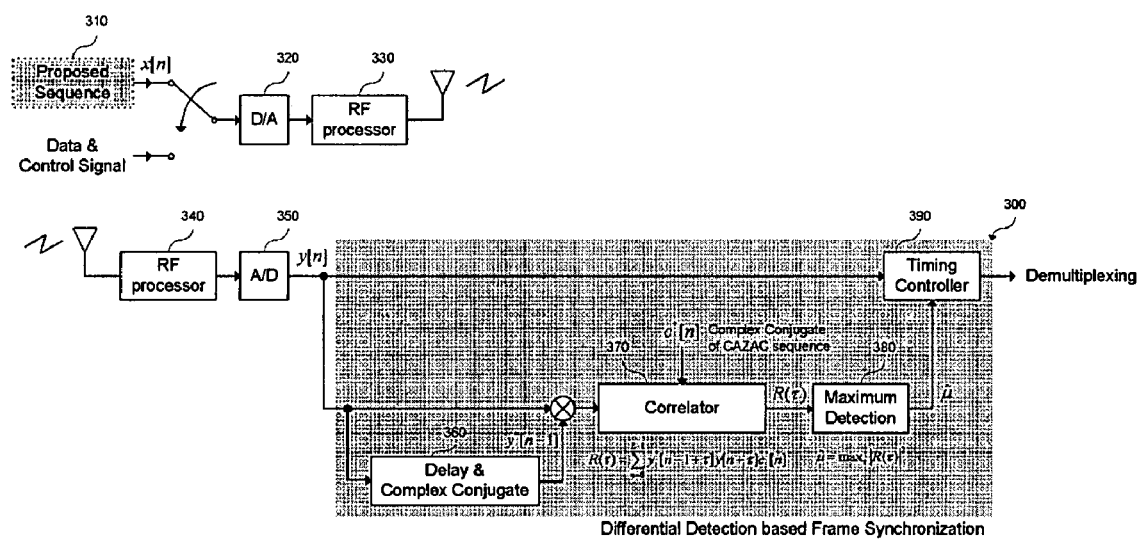
FIG. 4 is a block diagram illustrating the configuration of frame synchronization of a transmitting unit and a receiving unit using a training sequence according to a preferred embodiment of the present invention.

FIG. 4 is a block diagram illustrating the configuration of frame synchronization of a transmitting unit and a receiving unit using a training sequence according to a preferred embodiment of the present invention. Referring to FIG. 4, the training sequence 310 of the present invention is input with a switching operation ahead of the data & control signal 20, and is transmitted on a wireless channel via a D/A converter 320 and an RF processor 330. A receiving unit includes an RF processor 340, an A/D converter 350, and a differential detection-based frame synchronization 300. Herein, the differential detection-based frame synchronization 300 includes a delay & complex conjugate 360, a correlator 370, a maximum detection 380, and a timing controller 390.

When a received signal which considers a timing offset τ past the A/D converter 350 is set to y[n+τ], a signal which has gone through the delay & complex conjugate 360 equals $\dot{y}[n-1+\tau]$, and hereafter, a differential signal obtained by carrying out an operation of complex multiplication is used in a differential detection-based process of the correlator 370 as in EXPRESSION 4.

Expression 4

$$R(\tau) = \sum_{n=1}^{L-1} \dot{y}[n-1+\tau]y[n+\tau]x[n-1]\dot{x}[n],$$

where L represents the length of the training sequence, and x[n] represents the promised training sequence of the present invention between the transmitter and the receiver.

A process of the maximum detection 380 past the differential detection-based process of the correlator 370 can be represented as in EXPRESSION 5 in the same manner as in EXPRESSION 3, and an estimated timing offset, i.e., a frame starting point $\hat{\mu}$, is delivered to the timing controller 390.

Expression 5

$$\hat{\mu} = \max_{\tau} |R(\tau)|^2$$

In this manner, in a case where the differential detection-based correlation process is performed in the receiving unit, the characteristics causing the performance degradation of the prior CAZAC sequence due to the frequency offset can be complemented. Yet, in a case when the differential detection-based correlation process is performed by using the prior CAZAC sequence, good properties of the PAPR and the auto-correlation that the prior CAZAC sequence has, cannot be used.

Consequently, a main and essential design method is that the training sequence of the present invention is set in a scheme where a differential value corresponds to an original CAZAC sequence as represented in EXPRESSION 6, so that a first correlation property of EXPRESSION 4 may have a similar result to a second correlation property of EXPRESSION 1, in a case where the correlation is performed based on the scheme of the differential detection in the receiving unit as in EXPRESSION 4.

Expression 6

$$c[n] = \dot{x}[n-1]x[n], \ (n \geq 1, x[0] = \exp[j\phi])$$

The training sequence of the present invention which satisfies EXPRESSION 6 can be represented as in EXPRESSION 7.

Expression 7

$$x[n] = \begin{cases} \exp\left[\dfrac{j\pi k}{L}\dfrac{n(n+1)(n+5)}{3} + j\phi\right], & L \text{ is odd} \\ \exp\left[\dfrac{j\pi k}{L}\dfrac{n(n+1)(2n+7)}{6} + j\phi\right], & L \text{ is even} \end{cases}$$

In EXPRESSION 7, an initial phase value $\phi$ can be arbitrarily set. When EXPRESSION 6 is considered, the differential detection-based correlation process of EXPRESSION 4 equals the following EXPRESSION 8 in the end, which signifies that the property of the prior CAZAC can be applied as it is as a reference signal in a process for performing the correlation.

Expression 8

$$R(\tau) = \sum_{n=1}^{L-1} \dot{y}[n-1+\tau]y[n+\tau]\dot{c}[n]$$

The simulation for performance verification of the training sequence proposed in the present invention is carried out while recording statistical performance numeric values through a large number of iteration procedures in an Additive White Gaussian Noise (AWGN) environment which varies at random, and its results are shown in FIGS. 5 to 8. Sequences set to sequences compared with one another for a performance evaluation are as follows:

a CAZAC sequence (a prior CAZAC sequence), a random sequence (a sequence which has a random phase with equal electric power), and a proposed sequence (a training sequence of the present invention).

The random sequence among the comparison object sequences is represented as EXPRESSION 9, and has a phase value set to a phase value which is not prescribed but has a random form in order to distinguish the random sequence from the prior CAZAC sequence, from which a statistical performance is derived.

Expression 9

$$r[n] = \exp[j2\pi\theta_i],$$

where $\theta_i$ is a random variable with respect to i, and r[n] follows the form of a uniform distribution within the interval [−0.5, 0.5].

The above random sequence is merely set in order to compare the performance of the training sequence of the present invention with the performance of the random sequence. A differential detection-based frame synchronization is performed in the same manner as the training sequence of the present invention with respect to the random sequence.

Figure 5:
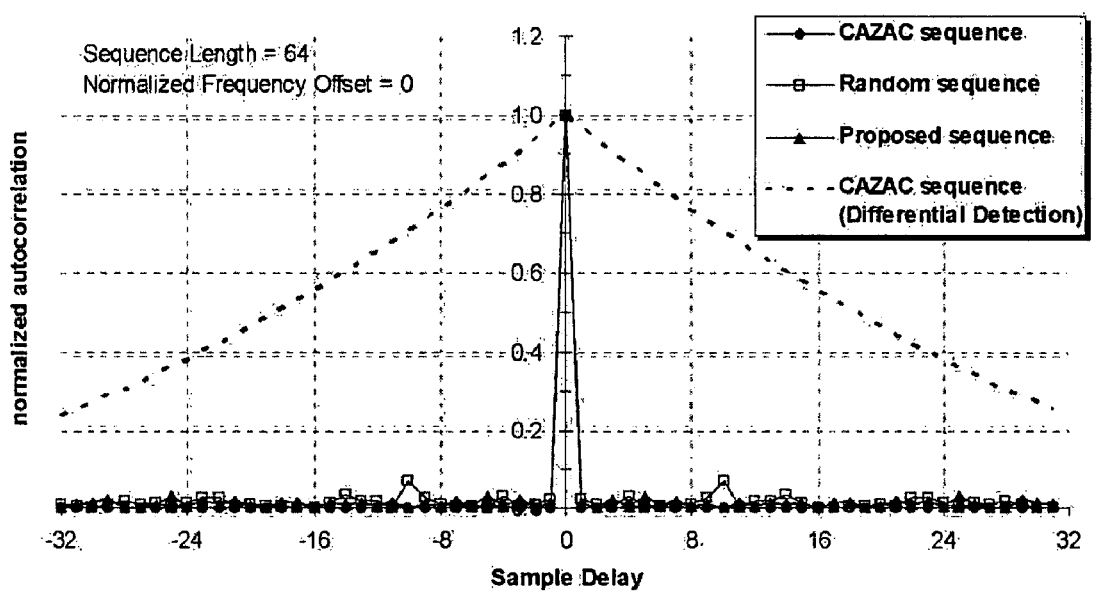
FIG. 5 is a graph showing a comparison of a correlation property of a proposed training sequence of the present invention with other sequences.

FIG. 5 is a graph showing a comparison of an auto-correlation property of a proposed training sequence of the present invention with other sequences.

Three graphs, expressed in a solid line, denote respectively a first auto-correlation property of the training sequence of the present invention to which the differential detection-based correlation scheme is applied, a second auto-correlation property of the CAZAC sequence to which the prior simple correlation scheme is applied, and a third auto-correlation property of the random sequence to which the differential detection-based correlation scheme is applied. A graph, expressed in a dotted line, signifies a fourth auto-correlation property of the CAZAC sequence to which the differential detection-based correlation scheme is applied. As shown in FIG. 5, the auto-correlation properties of the three sequences are almost identical to one another, and the three sequences have definite detection properties at '0' corresponding to an accurate starting point in time. However, in a case where the differential detection-based correlation scheme is applied to the prior CAZAC sequence as expressed in a dotted line, it is ascertained that a relatively indefinite detection property is shown, which becomes a cause incurring the performance degradation of the frame synchronization. Accordingly, in a graph illustrating the performance, the performance of a CAZAC sequence to which the differential correlation scheme is applied will not be presented.

Figure 6:
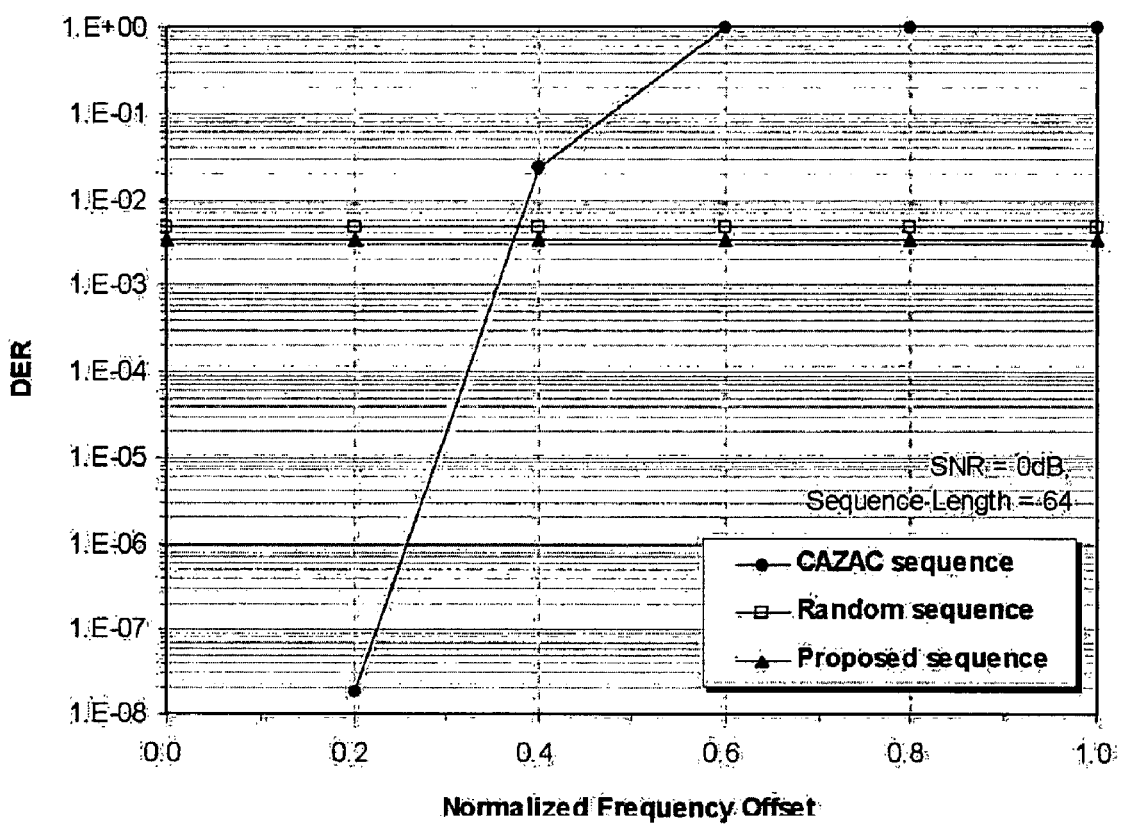
FIG. 6 is a graph showing a comparison of the Detection Error Rate (DER) of a proposed training sequence of the present invention with other sequences according to a frequency offset.

FIG. 6 is a graph showing a comparison of the Detection Error Rate (DER) of a proposed training sequence of the present invention with other sequences according to a frequency offset.

Herein, a frequency offset $\epsilon$ is a value obtained by normalizing an actual frequency offset $\Delta f$ on the basis of an inverse number of T denoting the section of a sequence.

Expression 10

$$\varepsilon = \frac{\Delta f}{T^{-1}} = \Delta fT$$

As shown in FIG. 6, while the simple correlation scheme using the prior CAZAC sequence has a relatively low DER when a normalized frequency offset is less than 0.4, the DER increases when the normalized frequency offset is equal to or more than 0.4. It can be confirmed that the DER becomes a value which is nearly close to '1' when the normalized frequency offset is more than 0.5. Namely, if the normalized frequency offset is more than 0.5, it means that the detection of the prior CAZAC sequence is impossible. On the other hand, the DERs of the training sequence of the present invention and of the random sequence show constant performances regardless of the value of the frequency offset. In the case of a sequence length of 64 and SNR=0 [dB], the training sequence of the present invention and the random sequence respectively indicate their performances of about $3 \times 10^{-3}$ and about $5 \times 10^{-3}$. Hence, it can be ascertained that the proposed training sequence of the present invention shows the best performance.

Figure 7:
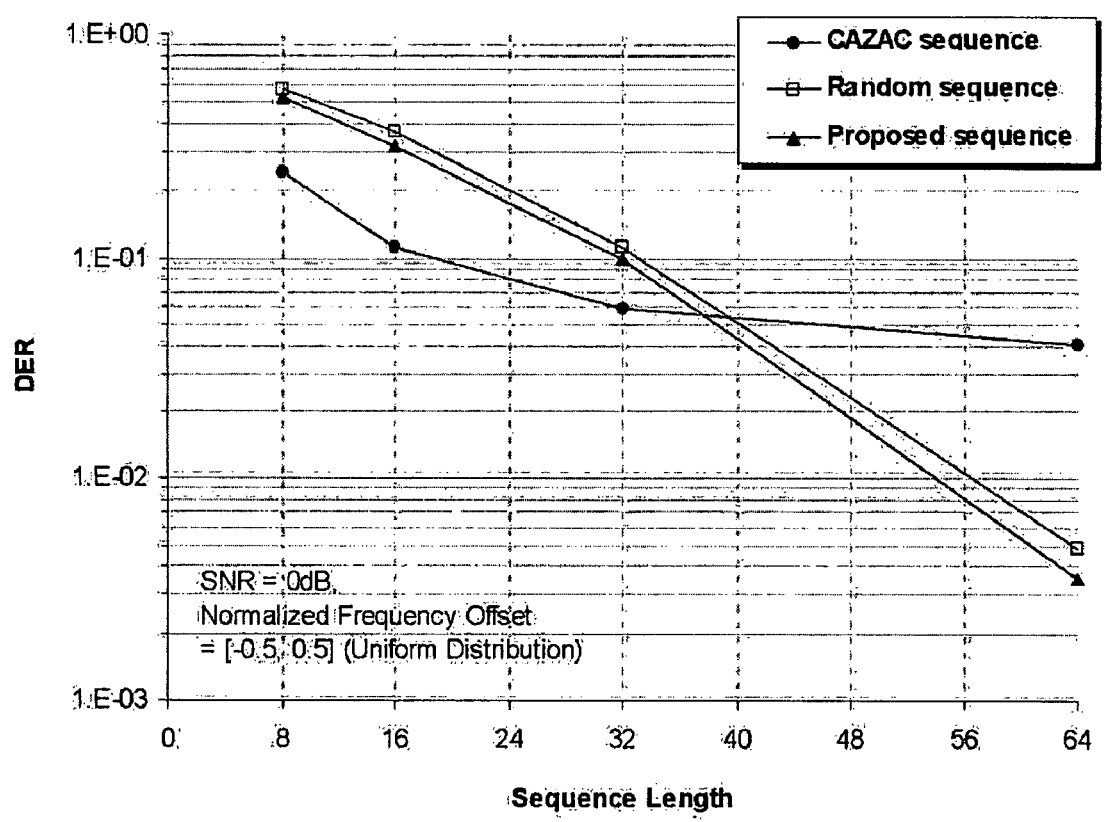
FIG. 7 is a graph showing a comparison of the detection error rate of a proposed training sequence of the present invention with other sequences according to the sequence length.

FIG. 7 is a graph showing a comparison of the detection error rate of a proposed training sequence of the present invention with other sequences according to the sequence length.

Herein, a normalized frequency offset is set at random in the form of a uniform distribution within the interval [−0.5, 0.5]. A result of carrying out a performance evaluation on the basis of various sequence lengths shows that the longer the sequence length becomes, the lower the whole DER becomes. However, as shown in FIG. 7, as the sequence length increases to more than a predetermined value, the prior CAZAC sequence shows that the rate of decrease of its DER is lowered, whereas the proposed training sequence and the random sequence indicate that the rates of decrease of their DERs suddenly become larger. This indicates that the longer the sequence length becomes, the more advantageous the application of the proposed training sequence becomes. Hence, the results illustrated in FIG. 7 also show that the proposed training sequence of the present invention is the best.

Figure 8:
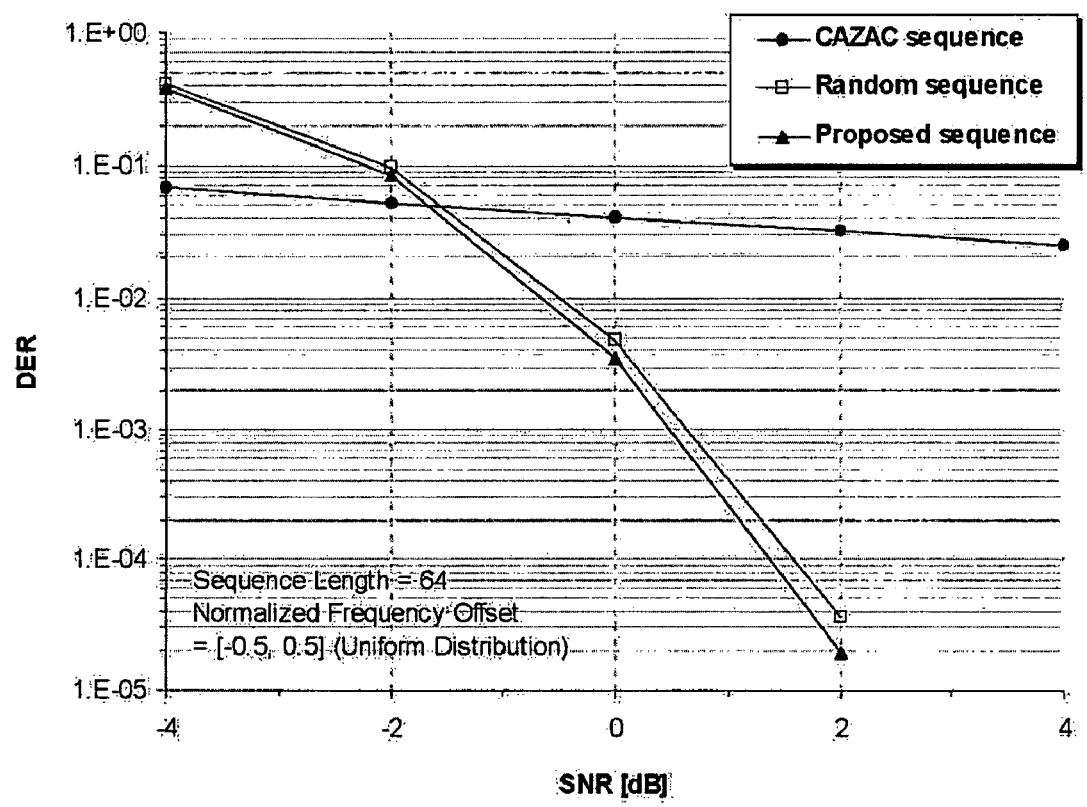
FIG. 8 is a graph showing a comparison of the detection error rate of a proposed training sequence of the present invention with other sequences according to Signal-to-Noise Ratio (SNR).

FIG. 8 is a graph showing a comparison of the detection error rate of a proposed training sequence of the present invention with other sequences according to the Signal-to-Noise Ratio (SNR).

Herein, a normalized frequency offset is set at random in the form of a uniform distribution within the interval [−0.5, 0.5]. As can be perceived from the graph of FIG. 8, although the prior CAZAC sequence indicates some performance improvement as the SNR increases, considered as a whole, the performance of the prior CAZAC sequence is degraded as compared with that of the proposed training sequence and of the random sequence in an environment where the frequency offset is generated. Furthermore, it can be ascertained that the proposed training sequence of the present invention has a performance gain of 0.3 [dB], as compared with the random sequence.

If the results of FIGS. 5 to 8 are considered as a whole, it indicates that the proposed training sequence has a better performance than the prior CAZAC sequence in an actual receiving environment where the frequency offset is generated.

The merits and effects of preferred embodiments, as disclosed in the present invention, and as so configured to operate above, will be described as follows.

As described above, a training sequence of the present invention can immensely improve the performance of frame synchronization in an actual receiving environment of a wireless communication system where a frequency offset is generated, and accordingly, is expected to be considerably advantageous in a terminal where the accuracy of an oscillator of a receiver is not high.

Furthermore, in a case where the training sequence of the present invention and a differential detection-based frame synchronization scheme are applied, in a process for operating the wireless communication system, a reduction of an initial synchronizing time and the overall performance improvement of a modem of the receiver can be attained.

While the invention has been shown and described with reference to a certain preferred embodiment thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for performing frame synchronization by setting a training sequence in a wireless communication system, the method comprising the steps of:
   configuring a transmitter to send a signal to a receiver, the signal incorporating the training sequence;
   setting the training sequence, x[n], between the transmitter and receiver using a differential detection-based frame synchronization unit of the receiver, in a scheme where a differential value of the training sequence corresponds to a Constant Amplitude Zero Auto-Correlation (CAZAC) sequence, c[n], according to EXPRESSION 6, so that a differential detection-based correlation property (EXPRESSION 4) equals a simple correlation property (EXPRESSION 1),
   wherein a simple correlation property using the CAZAC sequence, c[n], equals the EXPRESSION 1:

$$R(\tau) = \sum_{n=0}^{L-1} y[n+\tau] \overset{*}{c}[n] \qquad \text{EXPRESSION 1}$$

where y[n] corresponds to the received signal, and where L represents the length of the training sequence, c[n] is the CAZAC sequence and is set differently depending on a sectionalizing factor k as in the EXPRESSION 2 below:

$$c[n] = \begin{cases} \exp\left[\frac{j2\pi k}{L}\left(n + n\frac{n+1}{2}\right)\right], & L \text{ is odd} \\ \exp\left[\frac{j2\pi k}{L}\left(n + \frac{n^2}{2}\right)\right], & L \text{ is even} \end{cases} \qquad \text{EXPRESSION 2}$$

wherein a differential detection-based correlation property using the CAZAC sequence, c[n], equals the EXPRESSION 4:

$$R(\tau) = \sum_{n=1}^{L-1} \overset{*}{y}[n-1+\tau]y[n+\tau]x[n-1]\overset{*}{x}[n]; \text{ and} \qquad \text{EXPRESSION 4}$$

wherein the EXPRESSION 6 is as follows:
EXPRESSION 6

$$c[n] = \overset{*}{x}[n-1]x[n], \ (n \geq 1, n[0] = \exp[j\phi])$$

where x[n] corresponds to the training sequence set between the transmitter and the receiver.

2. The method as claimed in claim 1, wherein the training sequence satisfying the EXPRESSION 6 equals EXPRESSION 7 below:

$$x[n] = \qquad \text{EXPRESSION 7}$$

$$\begin{cases} \exp\left[\frac{j\pi k}{L}\frac{n(n+1)(n+5)}{3} + j\phi\right], & L \text{ is odd} \\ \exp\left[\frac{j\pi k}{L}\frac{n(n+1)(2n+7)}{6} + j\phi\right], & L \text{ is even} \end{cases},$$

wherein an initial phase value $\phi$ is arbitrarily set.

3. The method as claimed in claim 2, wherein, with the application of EXPRESSION 6, the differential detection-based correlation property of the EXPRESSION 4 equals EXPRESSION 8 below:

$$R(\tau) = \sum_{n=1}^{L-1} \overset{*}{y}[n-1+\tau]y[n+\tau]\overset{*}{c}[n]. \qquad \text{EXPRESSION 8}$$

* * * * *